Oct. 23, 1962     G. BAECHLI     3,059,757
CONVEYOR APPARATUS
Filed May 2, 1958
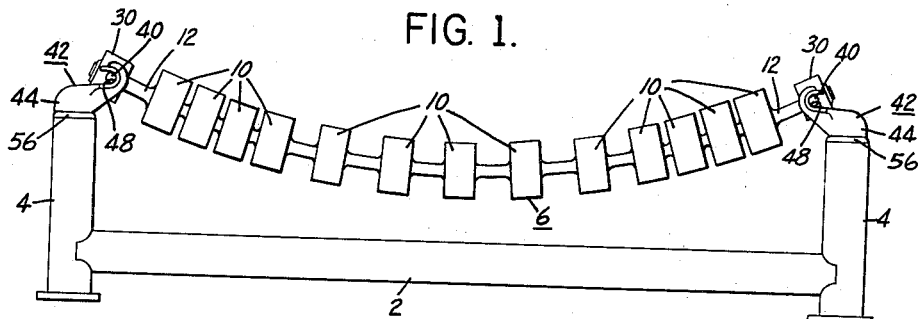
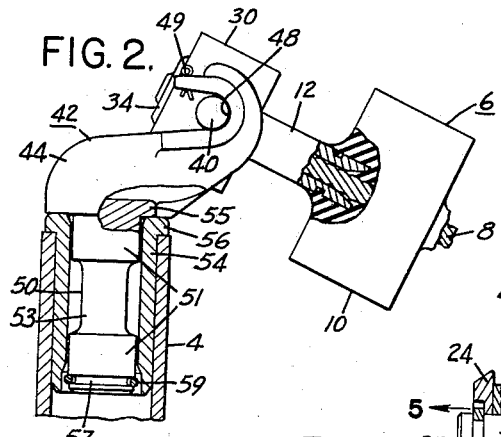
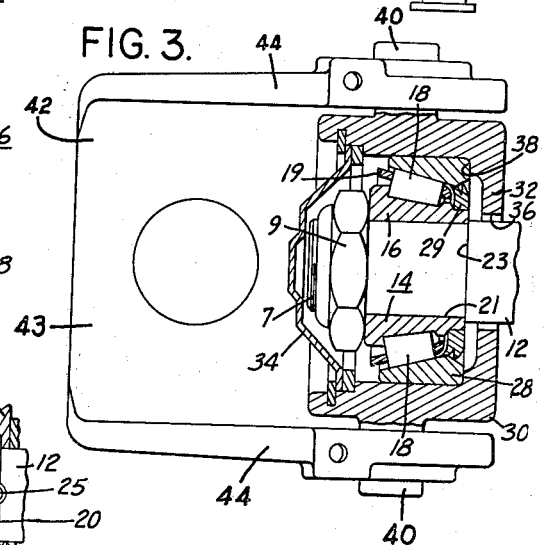
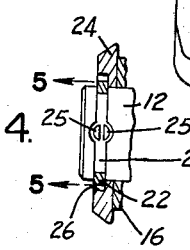
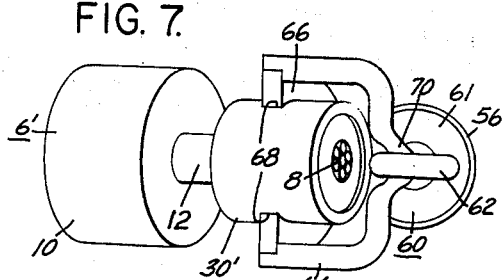
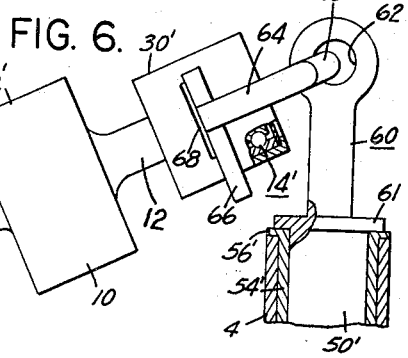
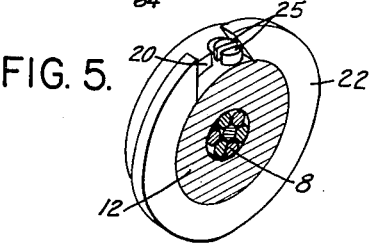
INVENTOR.
GEORGE BAECHLI
BY
ATTORNEY

3,059,757
CONVEYOR APPARATUS
George Baechli, New Philadelphia, Ohio, assignor to Joy Manufacturing Company, Pittsburgh, Pa., a corporation of Pennsylvania
Filed May 2, 1958, Ser. No. 732,697
9 Claims. (Cl. 198—192)

My invention relates to conveyor apparatus and more particularly to a new and improved device for supporting the end of a rotatable idler member.

At the present time it is common practice to rotatably support an elongated idler member by means of spaced bearings supported in spaced supports. Such idler members are employed to support an endless movable belt for conveying material, such as coal conveyors in coal mines, in which the load on the conveyor belt varies in weight and location so that load applied to the idler member varies both as to intensity, including shock load, and in its effective point of application. Such uneven application of the load subjects the idler members to varying stresses so that, in some installations, failure of the idler members has resulted. Heretofore, various means have been employed to support such idler members which have involved rather complex or expensive structures or which have not been entirely satisfactory in preventing failure of the idler members.

Accordingly, one object of my invention is to provide new and improved conveyor apparatus comprising an elongated, rotatable, flexible idler which is supported at each of its ends to permit flexure thereof in various directions transversely of its rotational axis.

A more specific object of my invention is to provide new and improved conveyor apparatus comprising an elongated flexible idler which is rotationally supported at each of its ends by pivotable bearings which are supported in a pivotable bracket.

A specific object of my invention is to provide new and improved conveyor apparatus comprising an elongated flexible idler which is rotationally supported at each of its ends by means of pivotable bearings each of which is supported by a trunnion bracket which is pivotable about an axis extending approximately perpendicular to the bearing pivot axis.

Still another object of my invention is to provide new and improved conveyor apparatus comprising an elongated flexible idler which is rotationally supported at each of its ends by bearings and which idler is retained within said bearings in a novel manner.

A further object of my invention is to provide new and improved conveyor apparatus comprising an elongated flexible idler which is rotationally supported at each of its ends by bearings and which idler is provided at each of its ends with a split securing ring located within a groove, portions of which groove are upset to prevent movement of said ring about said idler.

These and other objects of my invention will become more apparent when taken in conjunction with the following detailed drawings of preferred embodiments of my invention in which:

FIG. 1 is a front elevational view of a preferred form of conveyor apparatus constructed in accordance with the principles of my invention, FIG. 2 is an enlarged partial front elevation and partial front cross section view of a portion of the conveyor apparatus as shown in FIG. 1, FIG. 3 is a top plan view of a portion of the conveyor apparatus shown in FIG. 2 taken along the axis of the flexible member with the bearing and bearing housing portions thereof being shown in section, FIG. 4 is a partial cross sectional and partial plan view of another form of my invention showing the end portion of a flexible member and the structure adjacent thereto, FIG. 5 is a cross sectional view of a portion of the conveyor apparatus shown in FIG. 4 taken along line 5—5 thereof, FIG. 6 is a front elevational view of a portion of another form of conveyor apparatus constructed in accordance with the principles of my invention, FIG. 7 is a top plan view of the conveyor apparatus as shown in FIG. 6.

Referring to FIGS. 1, 2 and 3, it will be noted that a preferred form of conveyor apparatus constructed in accordance with the principles of my invention comprises a U-shaped stand 2 having spaced vertically extending supports 4 with an elongated flexible idler 6 rotatably supported therebetween in the form of a catenary. As is well known such idlers are employed to support a troughed, endless, movable conveying belt for transporting material over a surface. For the purposes of my invention the stand 2 may be of any suitable well-known construction including those in which the supports 4 are adjustable to suitably engage an uneven surface over which it is desired to convey material. Also, the particular construction of the belt supporting portion of the flexible idler 6 does not constitute a part of this invention a central elongated flexible stranded wire cable 8 with a plurality of spaced rollers 10 rigidly secured thereto intermediate its ends. Tubular metal sleeves 12 are rigidly secured to the ends of the cable 8, respectively, to provide for rotatably supporting the ends of the idler 6 by means of spaced anti-friction roller bearings 14 supported as hereinafter described by the supports 14, respectively.

Referring to FIG. 3, each of the bearings 14 comprises a hollow inner race 16 having a plurality of suitable bearing rollers 18 suitably supported in spaced relationship about its outer periphery by means of a suitable retaining ring 19. For the purpose of my invention the rollers 18 of the bearings 14 are preferably of a tapered cylindrical form which are supported by the races 16 and the rings 19 to diverge outwardly from the opposite ends of the cable 8, respectively. Each of the inner races 16 is provided with a central bore 21 to be slidably received over the outer cylindrical surfaces of the sleeves 12 with the inner side engaging a suitable retaining shoulder 23 on the sleeve 12 spaced inwardly from the outer end thereof. Inasmuch as the construction of such anti-friction bearings is well known in the art and does not constitute a part of my invention further description thereof is not believed to be warranted.

As can readily be appreciated when the idler 6 is suspended between the spaced supports 4 the weight of the idler 6 causes the idler 6 to form a catenary which exerts a force tending to pull the sleeves 12 axially inwardly through the bores 21 of the bearings 14. Under such loading it is necessary to secure the opposite ends of the idler 6 to the bearings 14 so that the sleeves 12 are retained within the bores 21 of the bearings 14. One particularly desirable structure for this purpose, see FIGS. 4 and 5, is to provide each sleeve 12 with a circumferential groove 20 adjacent its outer end in which a snap ring 22 is inserted in a manner as is well known in the art. Each snap ring 22 extends radially outwardly above the outer surfaces of the sleeves 12 and engages the outer end surface of the inner race 16 of the bearing 14 adjacent thereto. Although the snap rings 22 may be employed to engage the bearings 14, if desired a circular transfer plate may be provided between the outer end of an inner race 16 and a snap ring 22 to insure a greater area of engagement therebetween. Thus, as shown, a transfer plate 24 having a central opening to be slidably received over the outer surface of the sleeve 12 is located between the opposed surfaces of an inner race 16 and a snap ring 22. The transfer plate 24 preferably extends radially outwardly from the sleeve 12 beyond the outermost portion of the adjacent inner race 16 to insure engagement therewith and is provided with a circular recess 26 on its outwardly facing surface to closely receive the snap ring 22 therein.

In normal installations the snap rings 22 are formed from a spring steel while the sleeves 12 are formed from a less expensive steel which is softer than spring steel. Due to the weight of the idler 6 and any load thereon the snap rings 22 are forced into engagement with the outer sides of the grooves 20 so that spaced ends of the rings 22 engage the outer sides of the grooves 20. Under these circumstances, over a sufficient period of time, circumferential rotation of snap rings 22 in the grooves 20 causes the ends of snap rings 22 to machine the outer sides of the grooves 20 until the entire bearing surfaces for the snap rings 22 are removed and the idler 6 can no longer be retained in its operative position. As shown in FIGS. 4 and 5 the portion of each sleeve 12 adjacent and between the spaced ends of a snap ring 22 is deformed to form projections 25 extending inwardly from the sides of the grooves 20 so as to be in the path of rotational movement of the snap ring 22 in grooves 20. Such deformation of the sleeves 12 may be accomplished in any suitable manner such as by means of a suitable hollow punch engaging sleeve 12 to form and force the projections 25 inwardly of the groove 20. Although as shown and described both adjacent portions of a sleeve 12 are deformed to form a pair of projections 25, if desired, only one of such projections need be formed to prevent rotation of a snap ring 22.

As shown in FIG. 3, another means for securing the sleeves 12 to the bearing 14 is to provide suitable threads 7 on the outer end of each sleeve 12 for receiving a suitable lock nut 9, the inner surface of which engages the outer end surface of the inner race 16 of the bearing 14. The bearings 14 are provided with suitable tapered tubular outer races 28 which are rigidly secured within cup-shaped housings 30, respectively, in any suitable manner such as by being pressed therein whereby the bearings 14 are approximately centrally located. If desired, the outer races 28 may be formed integrally with the housings 30. As shown, the base portion 32 of each housing 30 is located adjacent an outer roller 10 and is provided with a central clearance opening 36 to freely pass over the outer surface of a sleeve 12. If desired, each housing 30 may be provided with an integral annular ledge 38 extending inwardly of the bore thereof to engage the inner edge of the outer race 28 to properly locate the bearing 14 therein. With the structure as heretofore described the housings 30 are initially formed as a subassembly with the outer races 28 secured therein. Such housing sub-assembly is then inserted over the free end of the sleeves 12 so that the sleeves 12 project through the clearance openings 36. The bearings 14 are then inserted over the free end of the sleeves 12 so that the rollers 18 engage the outer races 28. Thereafter the sleeves 12 are located with respect to the inner races 16 as heretofore described. After such assembly has been completed an outer dust cap 34 may be located within the outer end of the hollow housings 30 in any suitable manner as is well known in the art. Also if desired, a resilient annular gasket 29 may be inserted between the inner and outer races 16 and 28 adjacent the base portions 32 of the housings 30 to seal the inner ends of the bearings 14 from the atmosphere.

Each of the housings 30 is also provided with a pair of integral, diametrically opposed cylindrical trunnion pins 40 which extend outwardly from the outer surface of the housing 30 to permit the housing 30 to be pivotably supported by means of a trunnion portion of a supporting bracket 42. As shown in FIGS. 2 and 3 the trunnion portion of the bracket 42 is generally U-shaped with a horizontally extending bight portion 43 and formed arm portions 44 extending inwardly and vertically upward at the ends of the bight portion 43, respectively. Each arm 44 is provided with a suitably shaped elongated slot 48 extending inwardly and slightly upwardly from the edge normally facing outwardly from the idler 6. The inner end of each slot 48 is semi-circular in form and in horizontal alignment with the slot 48 in the other arm portion 44. As shown, the inner end of each slot 48 is also offset inwardly from the central axis of its supporting support 4, however, if desired, the rotative axis of the trunnion pins 40 may be located in vertical alignment with the central axis of supports 4, respectively. With such a trunnion portion structure and due to the flexibility of the cable 8, the ends of the idler 6 with the housings 30 located thereon may be removably secured to the trunnion portion of the bracket 42 by aligning the trunnion pins 40 with the open end of the slots 48, and thereafter permitting the trunnion pins 40 to slide into engagement with the inner end of the slots 48. In view of the weight of the idler 6 the trunnion pins 40 are normally pulled into engagement with the inner edge of the slots 48 so that the trunnion pins 40 are prevented from accidentally sliding back out of the slots 48 regardless of whether any load is applied to the idler 6. If desired suitable openings may be provided in each arm portion 44 adjacent the end of the slots 48, respectively, for receiving suitable means, such as cotter pins 49, to restrict the opening of the slots 48 and prevent accidental movement of the trunnion pins 40 outwardly therebeyond.

Each bracket 42 is also provided with an integral elongated shaft portion 50 the upper end of which is rigidly secured to the central portion of the bight portion 43 so that the shaft portion 50 extends downwardly therefrom along an axis parallel to the planes passing through the arm portions 44. Each shaft portion 50 is received in the upper end of a support 4 so as to be rotatable about its central longitudinal axis. By so locating each shaft portion 50, each shaft portion 50 pivots about a longitudinal axis which is perpendicularly located with respect to the axis about which the trunnion pins 40 and the housing 30, which it supports, pivots. In normal installations the supports 4 are formed from pipe having an open upper end of a substantial diameter so that elongated tubular bearing liners 54 are preferably provided which are closely rotatively received within the supports 4. The bearing liners 54 are provided with a bore of a size to closely rotatively receive the shaft portions 50 therein, respectively. The bearing liners 54 are of a suitable bearing material, such as bronze, and have integral outwardly extending flanges 56 at their outer ends engageable with the upper surfaces of the supports 4 respectively, whereby the bearing liners 54 may readily be located therein.

Although each shaft portion 50 may be of various suitable configurations, each shaft portion 50 preferably comprises spaced upper and lower cylindrical portions 51 with an integral cylindrical portion 53 of smaller diameter extending therebetween. The upper cylindrical portion 51 has an integral outwardly extending flange portion 55 at its upper end which is closely received within a suitable opening in the bight portion 43 of a bracket 42 and is rigidly secured thereto in any suitable manner such as by being welded thereto. The lower surface of the flange portion 55 rotatively engages the upper surface of the flange 56 of the bearing liner 54. A circumferential groove 57 is provided adjacent the lower edge of the lower cylindrical portion 51 in which a diametrically contractible split ring 59 is received for preventing the shaft portion 50 from being accidentally removed from a support 4 by an upwardly directed force. The ring 59 has a normal diameter greater than the diameter of the bearing liner 54, however, it is provided with a sufficient width of opening to permit the ring 59 to be compressed and slipped axially downwardly along the bore of the bearing liner 54. In order to facilitate such compression of the ring 59 the upper and lower ends of the bore of the bearing liner 54 are flared outwardly. With such structure the ring 59 expands to its normal diameter when received in the lower flared portion of the bearing liner 54 whereby a force sufficient to compress the ring 59 must be exerted before the shaft portion 50 may be withdrawn axially upward from the support 4.

With the structure as heretofore described it will be obvious that each individual stand 2 of an elongated series of such stands may be placed as desired on the surface over which it is desired to convey material so that the upper ends of the supports 4 are located in substantially the same horizontal plane. A bearing liner 54 is then inserted in each of the upper ends of the supports 4 so that it is supported therein by the engagement of its flange 56 with the upper edge of the pipe supports 4, the shaft portions 50 of the brackets 42 are inserted in the bearing liners 54 respectively, and the idler 6 inserted in the spaced brackets 42 in the manner as heretofore indicated. As the trunnion pins 40 are pivotably received between the arm portions 44 of the bracket 42 the idler 6 is free to deflect downwardly due to any heavy load which may be gradually or suddenly applied to the idler 6. As the shaft portions 50 are pivotably received within the supports 4 the brackets 42 are free to rotate within the bores of the bearing liners 54, respectively, to permit the idler 6 to give laterally of the supports 4 under any sustained or intermittent loading of the idler.

FIGS. 6 and 7 illustrate another embodiment of my invention in which like parts have been identified by the same reference numeral and similar parts have been identified by the same reference numeral with a prime thereafter. In this embodiment it will be noted that the brackets 42 previously described have been replaced by elongated pivotable brackets 60 having cylindrical shaft portions 50' at their lower end which are pivotably received within a bearing liner 54' inserted within the supports 4. The bracket 60 is also provided with an integral outwardly extending circular flange 61 adjacent the upper end of the shaft portion 50' which engages the upper flange 56' of the bearing liner 54' to locate the bracket 60 longitudinally with respect to the support 4. The upper end of the bracket 60 is provided with a circular eyepiece 62 through which the bight portion of a U-shaped bracket 64 extends. The free end of each arm of the bracket 64 is rigidly secured to the upper portions of the arms respectively of a generally U-shaped cradle 66 in any suitable manner such as by welding. Cradle 66 is of a configuration to support a suitable housing 30' having a suitable bearing 14' therein. It will be apparent, however, that the bracket 64 must be inserted through the eyepiece 62 prior to being secured to the cradle 66.

The housings 30' are provided with spaced chordal slots 68 which slidably receive the arms of the cradle 66 therein whereby the idler 6' may readily be removably located therein. With such structure the bearing is supported for pivotable movement about the eyepiece 62 and, at the same time, the eyepiece 62 is pivotally supported by the supports 4 so that the idler 6' may flex under load conditions in the same manner as heretofore indicated with reference to the first described embodiment of my invention. If desired, the bight portion of the bracket 64 may be deformed to provide an integral outwardly extending offset 70 engageable with the side of the eyepiece whereby the bracket 64 is retained in proper alignment with respect to the bracket 60. Also, if desired, bracket 60 may be provided with a slot, not shown, whereby the bearing holders may also be removed from the supports.

Although I have shown and described various forms of conveyor apparatus which incorporate the various features of my invention in accordance with the patent statutes, I am aware that other modifications may be made without departing from the spirit and scope of my invention. Accordingly, it is desired that the invention be not limited to the particular forms of conveyor apparatus specifically shown and described herein, but that the invention should be given a broad scope and be limited only by the appended claims and the prior art.

What I claim is:

1. Conveyor apparatus comprising, a bracket having an elongated portion extending therefrom which is adapted to be secured to a support to be pivotable about a longitudinal axis thereof, a housing supported by said bracket to be pivotable with respect thereto on an axis extending transversely of said longitudinal axis, and said housing having means to rotatively support one end of an idler member.

2. Conveyor apparatus comprising, a support, a bracket having an integral elongated portion secured to said support to be pivotable about a longitudinal axis thereof, a housing supported by said bracket outwardly of said support to be pivotable with respect thereto on an axis extending transversely of said first mentioned axis, and said housing having means to rotatively support one of an idler member.

3. Conveyor apparatus comprising, a support having an elongated hollow portion, a bracket having an integral elongated shaft portion located in said hollow portion of said support to be pivotable about a longitudinal axis thereof, a formed housing supported by said bracket outwardly of said support to be pivotable with respect thereto on an axis extending transversely of said longitudinal axis, and said housing having means therein to rotatively support one end of an idler member.

4. Conveyor apparatus comprising, a support having an elongated hollow portion, a bracket having an integral elongated shaft portion located in said hollow portion of said support to be pivotable about a longitudinal axis thereof, a housing supported by said bracket outwardly of said support to be pivotable with respect thereto on an axis extending transversely of said longitudinal axis, said housing having means to rotatively support one end of an idler member, and said axis being transversely offset from each other.

5. Conveyor apparatus comprising, a support having an elongated hollow portion, a bracket having a U-shaped portion with a shaft portion depending from the bight portion thereof, said shaft portion being received in said hollow portion to be pivotable about an axis extending between planes passing through the arms of said U-shaped portion, said bracket having transversely aligned openings in said arms, a housing located between the arms of said U-shaped portion and having integral opposed outwardly extending pins pivotably received in said aligned openings, and said housing having means to rotatively support one end of an idler member.

6. Conveyor apparatus comprising, a support having an elongated hollow portion, a bracket having a U-shaped portion with a shaft portion depending from the bight portion thereof, said shaft portion being received in said hollow portion to be pivotable about an axis extending between planes passing through the arms of said U-shaped portion, said bracket having an open-ended slot in each arm thereof with the ends of said slots being in lateral alignment, a housing located between said arms of said U-shaped portion and having integral opposed outwardly extending pins pivotably received in said aligned slots, and said housing having means to rotatively support one end of an idler member.

7. Conveyor apparatus comprising, a support having an elongated hollow portion, an elongated member having a shaft portion at one end pivotably received in said hollow portion, a U-shaped bracket extending through an opening in the other end of said member so that the bight portion thereof pivotably engages a portion of said member forming a side of said opening, a U-shaped hanger having the arms thereof secured to the arms of said bracket, and said hanger being adapted to support means for supporting one end of an idler member for rotational movement thereof.

8. Conveyor apparatus comprising, a support having an elongated hollow portion, an elongated member having a shaft portion at one end pivotably received in said hollow portion, a U-shaped bracket extending through an opening in the other end of said member so that the bight portion thereof pivotably engages a portion of said member forming a side of said opening, said bight portion of said bracket being offset to locate said bight portion with respect to said member, a U-shaped hanger having the arms thereof secured to the arms of said bracket, and said hanger being adapted to support means for supporting one end of an idler member for rotational movement thereof.

9. Conveyor apparatus comprising, a pair of spaced elongated supports, an elongated flexible idler member extending between said supports, bearings supporting said idler member at least adjacent the ends thereof, respectively, to permit said idler member to turn about a rotative axis thereof, bracket members located in said supports to be pivotable about a longitudinal axis thereof, respectively, housing means for supporting said bearings, respectively, and said housing means being supported by said brackets to permit pivotable movement thereof on axes extending transversely of said longitudinal axes, respectively, and transversely of said rotative axis.

References Cited in the file of this patent

UNITED STATES PATENTS

| | | |
|---|---|---|
| 633,987 | Clough | Oct. 3, 1899 |
| 981,471 | Proal | Jan. 10, 1911 |
| 2,555,765 | Shank | June 5, 1951 |
| 2,698,077 | Baechli | Dec. 28, 1954 |
| 2,781,124 | Troller | Feb. 12, 1957 |
| 2,815,851 | Yoshimura | Dec. 10, 1957 |
| 2,820,541 | Barnish et al. | Jan. 21, 1958 |
| 2,862,607 | Stamos et al. | Dec. 2, 1958 |

FOREIGN PATENTS

| | | |
|---|---|---|
| 890,337 | France | Feb. 4, 1944 |
| 1,037,156 | France | Sept. 15, 1953 |
| 329,132 | Great Britain | May 15, 1930 |